Jan. 31, 1956 L. H. OTTOFY 2,733,070

PHONOGRAPHIC DEVICE

Original Filed Sept. 14, 1944

Inventor
Ladis H. Ottofy.

by Atty

United States Patent Office 2,733,070

Patented Jan. 31, 1956

2,733,070

PHONOGRAPHIC DEVICE

Ladis H. Ottofy, Chicago, Ill.

Original application September 14, 1944, Serial No. 554,049. Divided and this application March 7, 1950, Serial No. 148,161

2 Claims. (Cl. 274—11)

This invention relates in general to a recording tape talking device, and is more particularly described as an advertising, commercial, or novelty phonograph for repeating words, phrases, greetings, slogans, or the like, in the operation of a movable toy, or by some structure which has sufficient movement to engage a length of tape upon which a message is recorded.

An important object of the invention is to provide an inexpensive toy or novelty phonograph which is easily operated by hand for producing a recorded message or sound.

A further object of the invention is to provide a sound reproducer and means for disengaging it from a phonographic tape when desired.

A further object of the invention is to provide a phonographic tape and means for reproducing sound from it in both directions of movement.

Other objects of the invention will appear in the specification and will be apparent from the accompanying drawings in which Fig. 1 illustrates an endless belt type of recording tape with inside and outside pickups;

Figure 8:
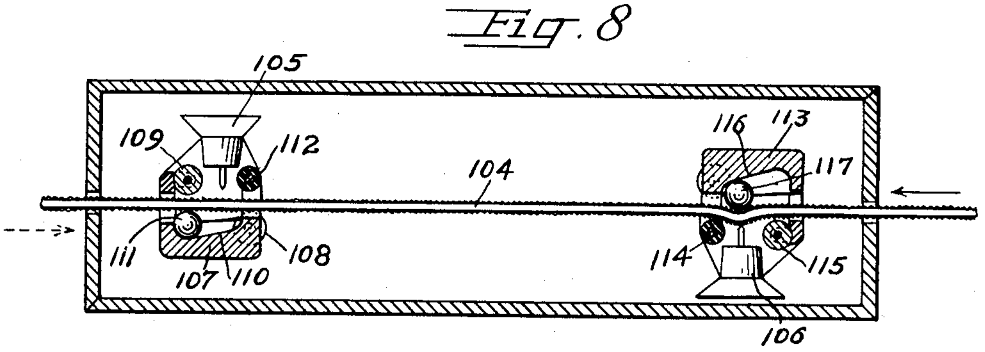
Figure 9:
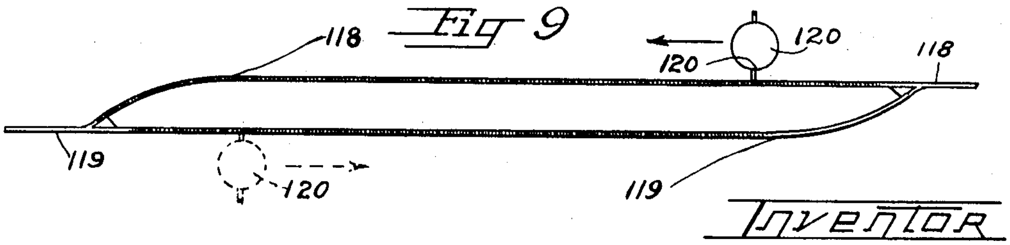

Fig. 8 shows a reproducer having a tape movable in opposite directions and two reproducers, one of which is engaged when the tape is moved in one direction, and the other when the tape is moved in the reverse direction; and Fig. 9 illustrates two sound tracks connected at the ends with a phonographic speaker engaging one sound track during its movement in one direction and the other sound track during its movement in the opposite direction.

Recording tapes have now been produced so that they may be applied in a variety of ways to reproduce sound for various purposes and uses. The tapes may be applied to wheels of toys or multiple paging systems; they may be connected together for multiple uses at the sides or edges of wheels, discs and similar articles; the opposite sides of connected tapes may be engaged at the same time or different times to produce different results, and multiple tapes may be moved in opposite directions to actuate different reproducing devices depending upon the direction of their movement.

This application is a division of my application for Wheeled Toy Phonograph, Serial No. 554,049, filed september 14, 1944, now Patent 2,504,042.

Referring now more particularly to the drawings, a multiple or two-way use of the sound producers is shown utilizing sound tapes 91 and 92 secured together at their backs so that the reproducing surfaces are outermost. An endless tape 93 of this kind may be mounted upon wheels 94 and 95 so that reproducer pickups 96 and 97 may be moved to engage either the inside or the outside tape at different times, or if desired, at the same time.

Figures 1, 2, 3, 4, 5, 6, 7:
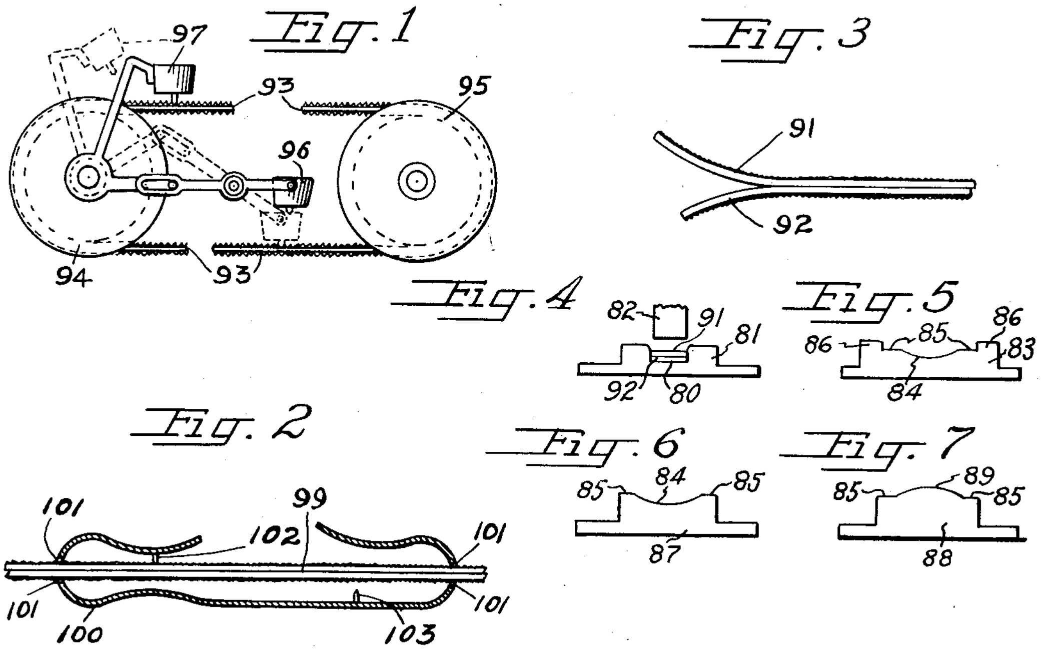
Fig. 2 illustrates a straight type of reproducer tape having sound records on opposite sides with a reproducer slide for engaging either side thereof.
Fig. 3 illustrates a tape of the type shown in Figs. 1 and 2 having recording portions on opposite sides thereof and made from two separate tapes secured together.
Figs. 4, 5, 6 and 7 illustrate dies for bonding two tapes together in straight or curved form.

To secure sound tapes 91 and 92 together, they may be placed in a trough 80 of a die member 81 and there pressed together with an adhesive between them by an upper die member or a roller 82. A bottom die member 83 is shown in Fig. 5 with a curved groove 84 and straight side edges 85 and with upwardly projecting side guides 86. In Fig. 6, a die member 87 is provided having a central groove 84 and a straight side 85, but omitting the side guides 86. In Fig. 7, a bottom die member 88 has an upwardly rounded bulge 89 with straight side edges 86 also omitting the side guards 86 of Fig. 5. For these bottom die members 83, 87 and 88, corresponding upper die members are provided, and the tapes when connected together thereby, will have a downwardly extending groove with the die members of Figs. 5 and 6 and an upwardly extending groove with the die member of Fig. 7, all of the edge portions thereof being straight and uncurved.

For engaging a straight double tape 99, as shown in Fig. 2, a reproducer slide 100 may have openings 101 near the ends which are bent towards each other at the ends so that the tape will extend through the openings. This reproducer slide may be of sheet metal, plastic or other vibratory sounding material such that a stylus 102 attached to one of the free ends may be brought into engagement with one side of the recording tape and another stylus 103 is provided near the other end of the reproducer opposite the other free end of the slide and on the opposite side of the tape to engage the other reproducing surface thereof. Thus when one of the bent over extremities of the reproducer is pressed against the tape at one side, the sound recorded thereon will be reproduced, and when the other end of the slide is pressed inwardly, the other stylus 103 will engage the other reproducing side of the tape.

A similar double tape 104 having sound tracks on opposite sides may have sound reproducing from either side thereof depending upon the movement of the tape with respect to an upper reproducing device 105 and a lower reproducing device 106. The upper reproducing device 105 has a supporter 107 for rollers 108 and 109, tending to maintain the tape in the straight path. In an inclined guideway 110 is a through roller 111 contacting with the under side of the tape and movable by contacting with the tape in one direction to raise the tape into engagement with the stylus of the sound reproducer 105. An upper roller 112 limits the amount to which the tape may be raised. In the other reproducer, a support 113 carries rollers 114 and 115 for normally supporting the tape. At the upper side of the tape is an inclined guideway 116 for a roller 117 freely movable therein, depending upon the direction of movement of the tape and movable by contact with the groove to deflect the tape to engage the stylus of the sound reproducer 106 between the supporting rollers 114 and 115 when the tape is moved in a proper direction.

With this construction, the movement of the tape in one direction will automatically bring one of the reproducers into action and when the tape is moved in the other direction, the other reproducer will be brought into action.

Instead of moving the tape, a sound track may have two different portions spaced apart, one portion 118 for one direction and other portion 119 for the other direction, each joined to the other by a curved portion at one end so that a sound reproducing device 120 if moved to the end of either one of the tracks (as on portion 118) to the end of the curved portion and then reversed in direction of movement will follow the other track portion 119

(the device 120 thereupon being shown in broken outline), so that the sound reproduced in one direction will depend upon the message recorded upon the sound track 118, and the movement of the reproducer in the other direction will depend upon the message recorded on the other sound track 119.

From this it is apparent that different messages may be produced by the same sound reproducer moving in different directions or by a recording tape having different portions and moving in different directions to engage different sound reproducers.

Various other changes in construction, combination and arrangement of the parts may be made without departing from the spirit and scope of the invention.

I claim:

1. A phonographic sound tape device comprising a sound tape with sound tracks on opposite sides, a sound reproducing device for engaging the sound track of each side, a carrier for each reproducing device through which the tape is relatively movable, the carrier including a roller for engaging one surface of the tape, and means for relatively raising and lowering one sound track of the tape from and into engagement with one sound reproducer as the tape is relatively moved in one direction through the carrier.

2. A phonographic tape device in accordance with claim 1 in which the two carriers have rollers for engaging opposite surfaces of the tape and each carrier has the said means for relatively raising and lowering the corresponding sound track of the tape from and into engagement with its corresponding sound reproducing device depending upon the relative direction in which the tape is moved through the carrier.

References Cited in the file of this patent

UNITED STATES PATENTS

| | | |
|---|---|---|
| 1,219,752 | Majorana | Mar. 20, 1917 |
| 1,276,968 | Rutzen | Aug. 27, 1918 |
| 1,347,096 | Heck | July 20, 1920 |
| 2,287,377 | Gallier | June 23, 1942 |
| 2,430,538 | Somers | Nov. 11, 1947 |
| 2,491,037 | Dofsen | Dec. 13, 1949 |
| 2,496,047 | Goddard | Jan. 31, 1950 |
| 2,548,011 | Frost | Apr. 10, 1951 |
| 2,550,794 | Fisher | May 1, 1951 |

FOREIGN PATENTS

| | | |
|---|---|---|
| 325,795 | Great Britain | Feb. 21, 1930 |